(12) United States Patent
Otsuka

(10) Patent No.: US 6,339,703 B1
(45) Date of Patent: Jan. 15, 2002

(54) DIVERSITY RECEPTION SYSTEM

(75) Inventor: Yoshiaki Otsuka, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/105,468

(22) Filed: Jun. 26, 1998

(30) Foreign Application Priority Data

Jun. 26, 1997 (JP) ............................................. 9-170352

(51) Int. Cl.[7] ................................................. H04Q 7/38
(52) U.S. Cl. .............................. 455/276.1; 455/277.1; 455/269
(58) Field of Search .......................... 455/276.1, 277.1, 455/562, 269

(56) References Cited

U.S. PATENT DOCUMENTS

| | | | | |
|---|---|---|---|---|
| 5,535,423 A | * | 7/1996 | Dupuy ........................ | 455/562 |
| 5,602,555 A | * | 2/1997 | Searle et al. ................. | 455/562 |
| 5,724,666 A | * | 3/1998 | Dent ........................... | 455/562 |
| 5,828,944 A | * | 10/1998 | Uppaluri et al. ............. | 455/562 |
| 5,854,986 A | * | 12/1998 | Dorren et al. ............... | 455/562 |
| 5,859,842 A | * | 1/1999 | Scott .......................... | 455/562 |
| 5,970,410 A | * | 10/1999 | Carney et al. ............... | 455/446 |

FOREIGN PATENT DOCUMENTS

| | | |
|---|---|---|
| JP | 61-63119 | 4/1986 |
| JP | 1300634 | 12/1989 |
| JP | 3-93326 | 4/1991 |
| JP | 7-131405 | 5/1995 |
| JP | 7-202776 | 8/1995 |
| JP | 8-23482 | 1/1996 |

* cited by examiner

*Primary Examiner*—Daniel Hunter
*Assistant Examiner*—Thuan T. Nguyen
(74) *Attorney, Agent, or Firm*—Young & Thompson

(57) ABSTRACT

A diversity reception system used for a mobile radio communication system of a sector type is constructed using single-directivity transmitting-receiving antennas and a non-directivity receiving antenna, all of which are fixed to a support pole such as a steel pipe pole and a steel tower. The single-directivity transmitting-receiving antennas are fixed to a peripheral surface of the support pole and are arranged in directions corresponding to sectors respectively. The non-directivity receiving antenna is fixed to a head portion of the support pole and is arranged above the single-directivity transmitting-receiving antennas by a prescribed interval of distance, which corresponds to at least nine wavelengths of radio waves. The single-directivity transmitting-receiving antennas are connected to transceivers, each containing a diversity receiver, respectively. A receiving power amplifier that amplifies receiving power input to the non-directivity receiving antenna is fixed to the support pole and is located just below the antennas and is provided to compensate a low gain of the non-directivity receiving antenna. A distributor is provided for distributing an output of the receiving power amplifier to the transceivers respectively. Thus, diversity reception is performed using any one of the single-directivity transmitting-receiving antennas and the non-directivity receiving antenna.

7 Claims, 6 Drawing Sheets

DIVERSITY RECEPTION SYSTEM

BACKGROUND OF THE INVENTION

1. Field of the Invention

This invention relates to diversity reception systems that are applied to base stations of mobile radio communication systems. This application is based on patent application No. Hei 9-170352 filed in Japan, the content of which is incorporated herein by reference.

2. Description of the Related Art

An example of the conventional diversity reception system is disclosed by the paper of Japanese Patent Application, Publication No. Hei 7-131405, according to which antennas, a number of which is identical to a number of sectors, are used to effect diversity reception. Herein, each of the antennas is designed to have single directivity in transmission of signals and double or more directivity in reception of signals. Now, an outline of operation of the conventional diversity reception system will be described with reference to FIG. 3 and FIG. 4. FIG. 3 shows an example of the diversity reception of three-sector type, wherein an antenna 101 has a transmission/reception radiator for a direction 1001 and a transmission/reception radiator for a direction 1003. As similar to the antenna 101, an antenna 102 has a transmission/reception radiator for a direction 1002 and a transmission/reception radiator for a direction 1001, while an antenna 103 has a transmission/reception radiator for a direction 1003 and a transmission/reception radiator for a direction 1002. FIG. 4 shows detailed configurations following the antennas 101, 102 and 103, wherein there are provided transceivers 111, 112 and 113 as well as transmission/reception distributors 161, 162 and 163. Herein, a receiving input of the antenna 101 is distributed to the transceivers 111 and 113 by means of the transmission/reception distributor 161. Similarly, a receiving input of the antenna 102 is distributed to the transceivers 112 and 111 by means of the transmission/reception distributor 162, while a receiving input of the antenna 103 is distributed to the transceivers 113 and 112 by means of the transmission/reception distributors 163. Diversity reception in the direction 1001 is performed by selection or composition of the receiving input given from the transmission/reception radiator of the antenna 101 and the receiving input given from the transmission/reception radiator of the antenna 102.

The conventional diversity reception system suffers from problems as follows:

Relatively large-scale construction is required because the antennas TV should be fixed separately with each other. Fine sight is spoiled because the antennas themselves relatively stand out.

In the case of the antenna diversity reception using the space diversity, it is preferable to provide a distance corresponding to ten wavelengths or more for an interval between fixing locations of the antennas in order that correlation of electromagnetic waves, received by the antennas respectively, will be canceled. In the conventional diversity reception system, the diversity reception is effected using two antennas out of three antennas, so it is necessary to provide an interval of ten wavelengths or more between fixing locations of the antennas on the same horizontal plane. In the mobile telephone system whose market is rapidly growing these days, for example, such an antenna interval approximately ranges between two and three meters. When fixing the antenna (see FIG. 5), beams 181, which are used for fixing the antennas and each of which has a length of one to two meters, extend horizontally from an upper portion a steel pipe pole 171, so that the antenna is fixed at ends of the beams. Or, as shown in FIG. 6, a ring 182, which is used for fixing the antennas and which has a diameter of two to three meters, is provided at an upper portion of a steel tower, so that the antennas are fixed to the ring. In the above, however, the upper portion of the steel pile pole or the upper portion of the steel tower is heavy in weight. For this reason, it is necessary to provide a relatively large intensity for the steel pipe pole or the steel tower itself, while it is necessary to provide a relatively large intensity for construction foundation of the steel pipe pole or the steel tower. In addition, the antennas occupy relatively broad spaces, so they stand out to spoil the beauty surrounding them.

Another problem is that the conventional diversity reception system requires the transmission/reception distributors 161 to 163, a number of which corresponds to a number of the antennas. So, it is necessary to secure a fixing space for fixing them within the fixed space of the base station device. For this reason, it is hardly possible to narrow the space used for fixing the base station device.

A further problem is that in the conventional diversity reception system, each transceiver requires two receiving amplifiers. For this reason, it is impossible to downsize the system. In FIG. 4, receiving (electric) power input to the transceiver 111 via a transmission/reception terminal 121 is supplied to a receiving power amplifier 141 via a duplexer 131, wherein it is amplified and is then input to a diversity receiver 154. On the other hand, receiving power input to a terminal 124 is amplified by a RPA 142, then, it is input to a diversity receiver 154. The diversity receiver 154 selects one of two inputs thereof or mixes two inputs thereof so as to perform diversity reception. Other transceivers 112 and 113 operate as similar to the transceiver 111 described above. Incidentally, in FIG. 4, "TPA" is an abbreviation for "Transmitting Power Amplifier", while "RPA" is an abbreviation for "Receiving Power Amplifier".

SUMMARY OF THE INVENTION

It is an object of the invention to provide a diversity reception system, which is capable of reducing spaces occupied by multiple antennas fixed to a steel pipe pole or a steel tower.

Thus, it is possible to provide a more economical way for aerial engineering; it is possible to reduce a number of steps for construction of the diversity reception system; and it is possible not to spoil the beauty of the place where the antennas are fixed.

It is another object of the invention to provide a diversity reception system, which is capable of reducing a number of parts that configure a receiving system of the transceiver.

Thus, it is possible to reduce the overall size of the diversity reception system; and it is possible to narrow the space for fixing the system.

A diversity reception system of this invention used for a mobile radio communication system of a sector type is constructed using single-directivity transmitting-receiving antennas and a non-directivity receiving antenna, all of which are fixed to a support pole such as a steel pipe pole and a steel tower. The single-directivity transmitting-receiving antennas are fixed to a peripheral surface of the support pole and are arranged in directions corresponding to sectors respectively. The non-directivity receiving antenna is fixed to a head portion of the support pole and is arranged above the single-directivity transmitting-receiving antennas by a prescribed interval of distance, which corresponds to at least nine wavelengths of radio waves. The single-directivity transmitting-receiving antennas are connected to transceivers respectively. A receiving power amplifier that amplifies receiving power input to the non-directivity receiving antenna is fixed to the support pole and is located just below the antennas so as to compensate a low gain of the non-directivity receiving antenna. A distributor is provided for distributing an output of the receiving power amplifier to the transceivers respectively.

Incidentally, the transceiver is configured by a relatively small number of parts, i.e., a duplexer, a transmitting power amplifier, a receiving power amplifier, a transmitter and a diversity receiver.

Thus, diversity reception is performed using any one of the single-directivity transmitting-receiving antennas and the non-directivity receiving antenna.

Because of the above construction and arrangement of the antennas, it is possible to reduce intervals of distance between the antennas, so it is possible not to spoil the beauty surrounding the facility. In addition, it is possible to reduce the required strength of the support pole. Further, it is possible to reduce a number of parts required for the diversity reception.

BRIEF DESCRIPTION OF THE DRAWINGS

These and other objects, aspects and embodiment of the present invention will be described in more detail with reference to the following drawing figures, of which.

DESCRIPTION OF THE PREFERRED EMBODIMENT

Figure 1:
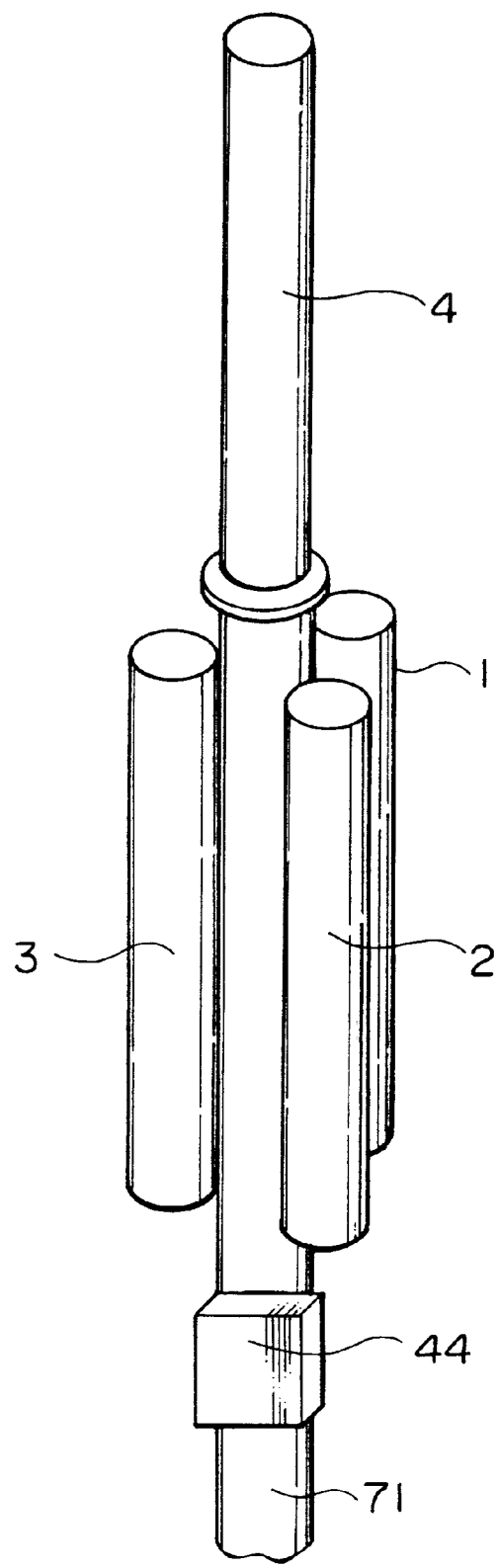
FIG. 1 is a perspective view showing a construction manner that antennas and a tower overhead receiving power amplifier are fixed to a steel pipe pole in accordance with the embodiment of the invention.

The diversity reception system of the present invention is a kind of the diversity reception system employed in the mobile radio communication system of the sector type. Herein, there are provided a non-directivity receiving antenna, shared by the sectors, as well as single-directivity transmitting-receiving antennas, a number of which corresponds to a number of the sectors. The present invention provides diversity reception by using any one of the single-directivity transmitting-receiving antennas and the non-directivity receiving antenna, which are located apart from each other by an interval of distance corresponding to at least nine wavelengths of transmitting-receiving radio waves.

In addition, all of the aforementioned antennas are fixed to a support pole, which stands vertically on the ground or else. Herein, the non-directivity receiving antenna is fixed to a head portion of the support pole, while the single-directivity transmitting-receiving antennas are fixed to a peripheral surface of the support pole in respective directions that cope with the sectors respectively.

According to the diversity reception system of the present invention, diversity reception is performed by selection or composition of a receiving input of the single-directivity transmitting-receiving antenna and a receiving input of the non-directivity receiving antenna. Therefore, an interval of distance for fixing the antennas used for the diversity reception is determined in such a way that there is provided an interval of distance corresponding to ten wavelengths or more between the single-directivity transmitting-receiving antenna and the non-directivity receiving antenna. In other words, it is unnecessary to separate the single-directivity transmitting-receiving antennas by ten wavelengths or more. Therefore, the single-directivity transmitting-receiving antennas are fixed in proximity to each other in such a degree that they are not affected by side lobe. The non-directivity receiving antenna is located above and apart from the single-directivity transmitting-receiving antennas in such a way that a center interval therebetween is ten wavelengths or more. In addition, locations of the antennas are determined in such a way that fault does not occur on the non-directivity receiving antenna due to the single-directivity transmitting-receiving antennas. As compared with the directivity antennas, the non-directivity antenna is small in gain, so it is necessary to compensate the gain. In addition, receiving power input to the non-directivity receiving antenna is distributed to multiple diversity receivers. Thus, each of the diversity receivers receives a small amount of power. So, it is necessary to compensate such a distribution loss. For this reason, as compared with the amplification factor of the receiving power amplifier that amplifies a receiving input of the single-directivity transmitting-receiving antenna, the amplification factor of the receiving power amplifier connected to the non-directivity receiving antenna is made large.

Figure 2:
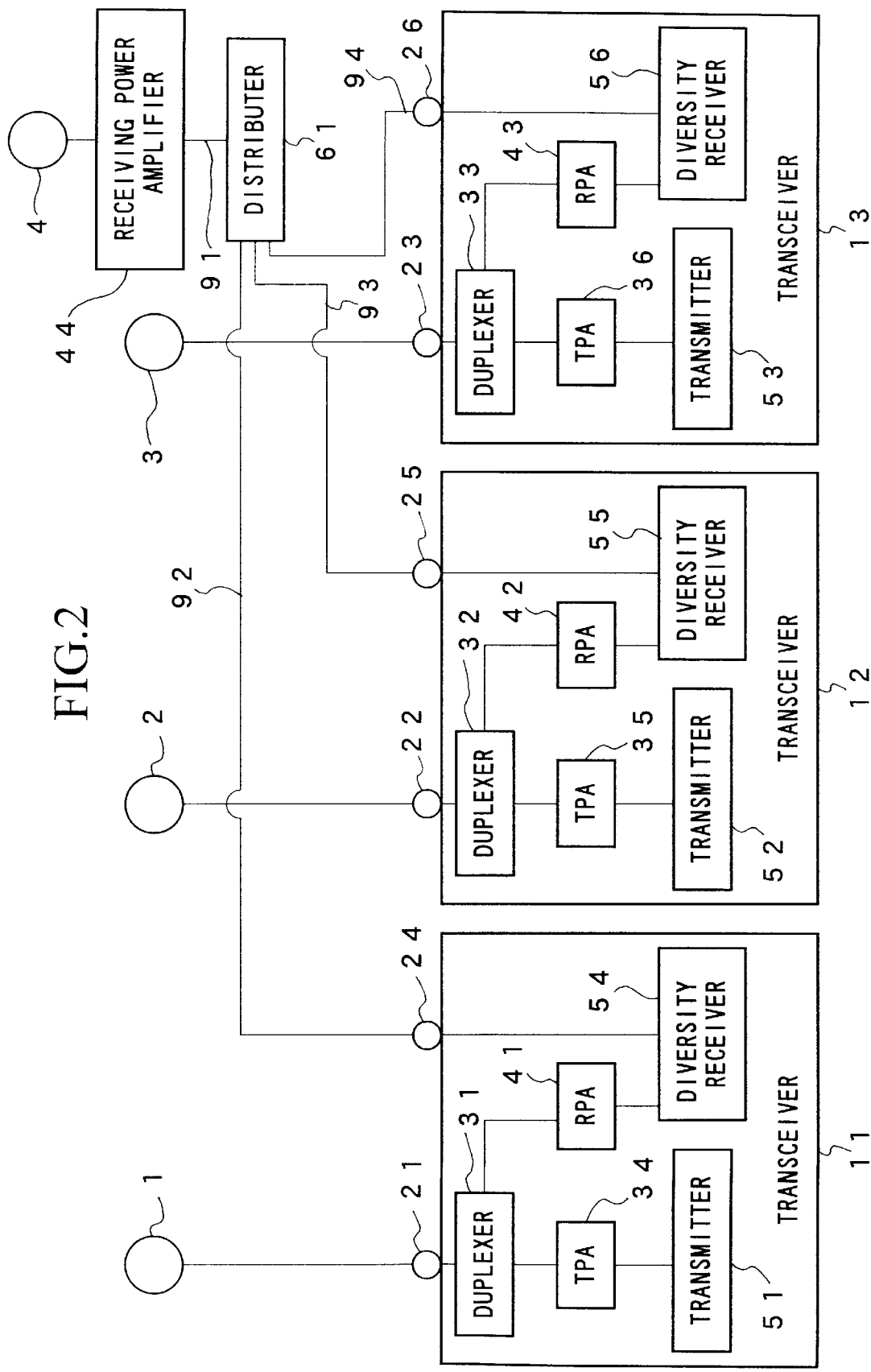
FIG. 2 is a connection diagram showing connections between antennas and transceivers in accordance with the embodiment of the invention.
Figure 3:
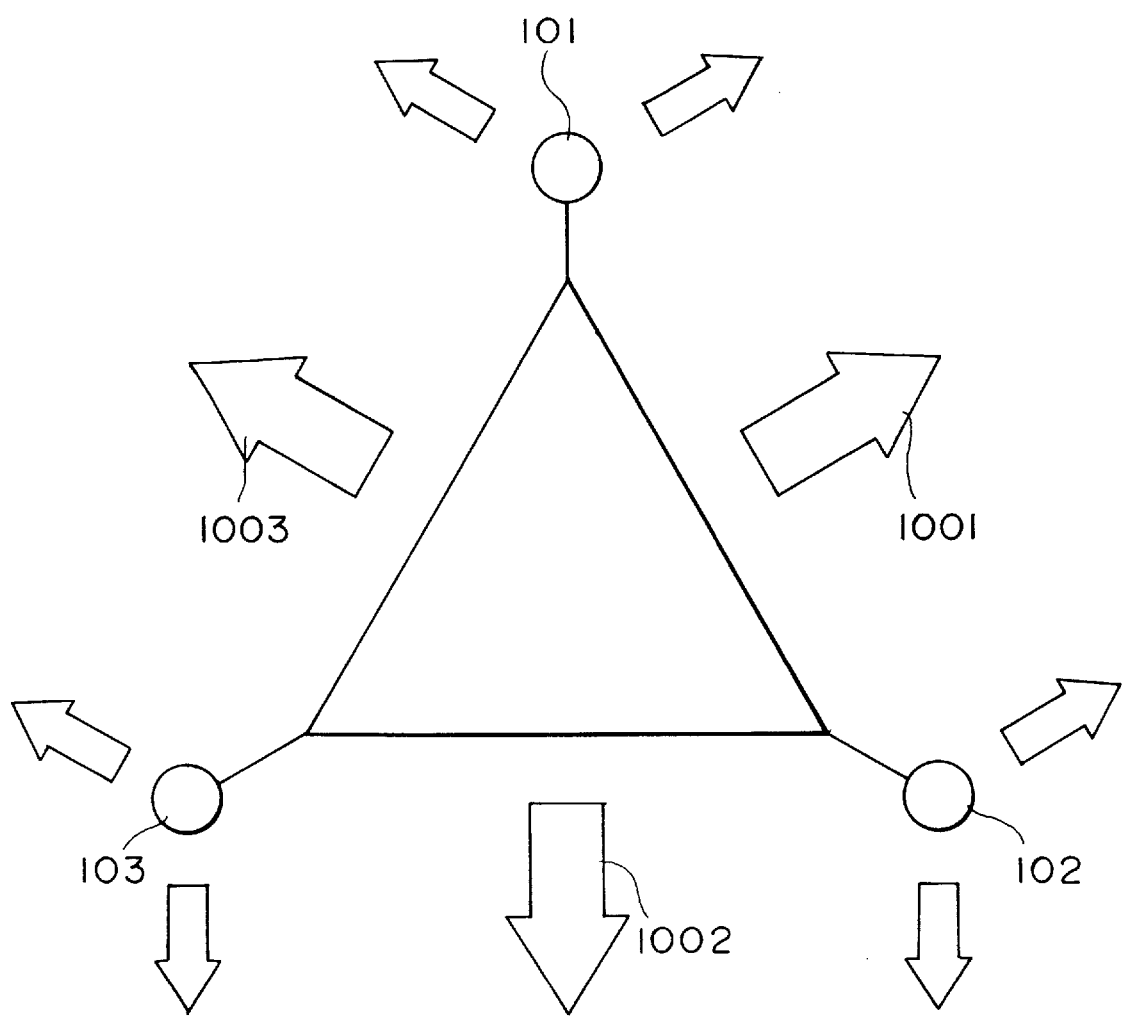
FIG. 3 is a plan view showing a construction of antennas in accordance with the conventional diversity reception system.
Figure 4:
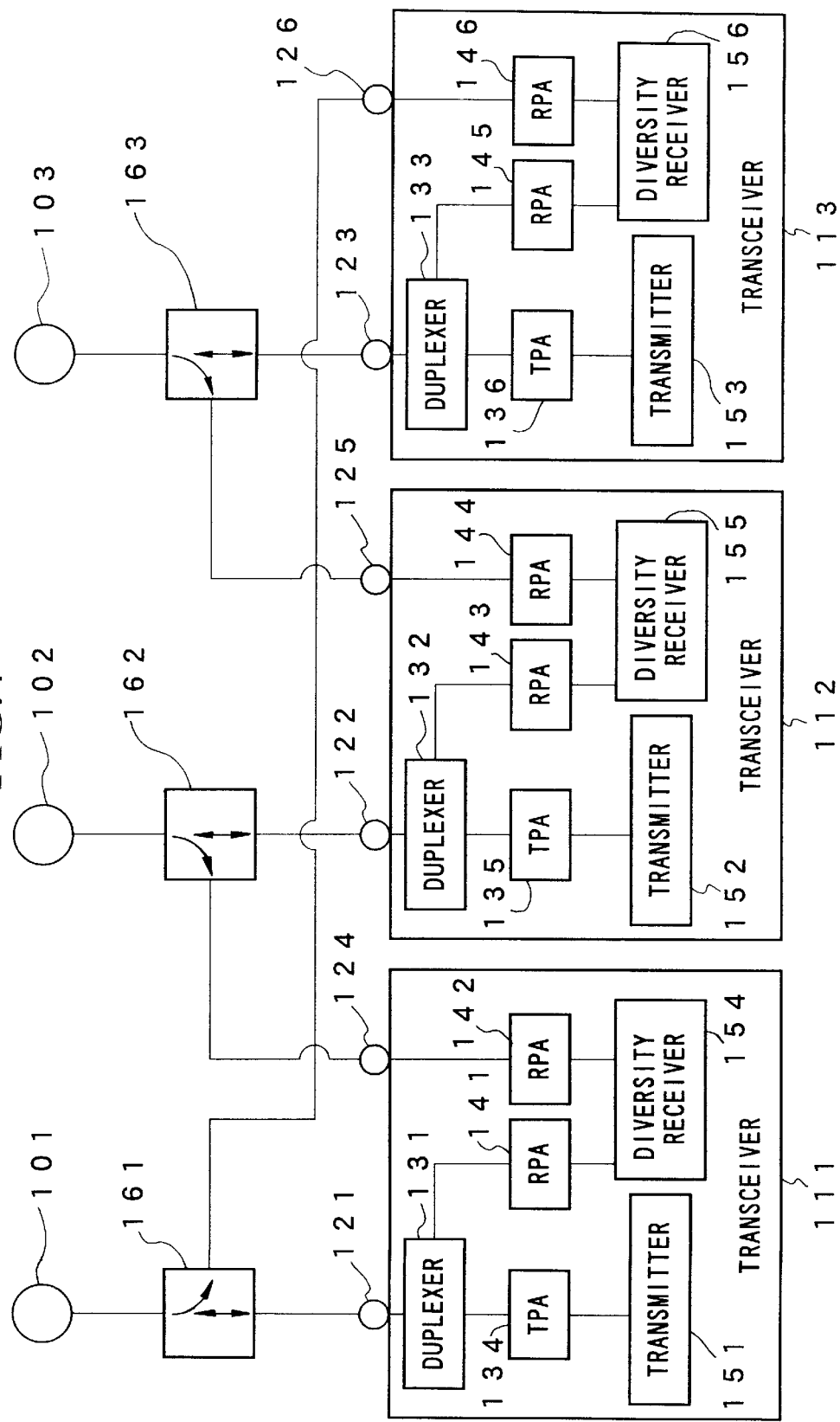
FIG. 4 is a connection diagram showing connections between antennas and transceivers in accordance with the conventional diversity reception system.
Figure 5:
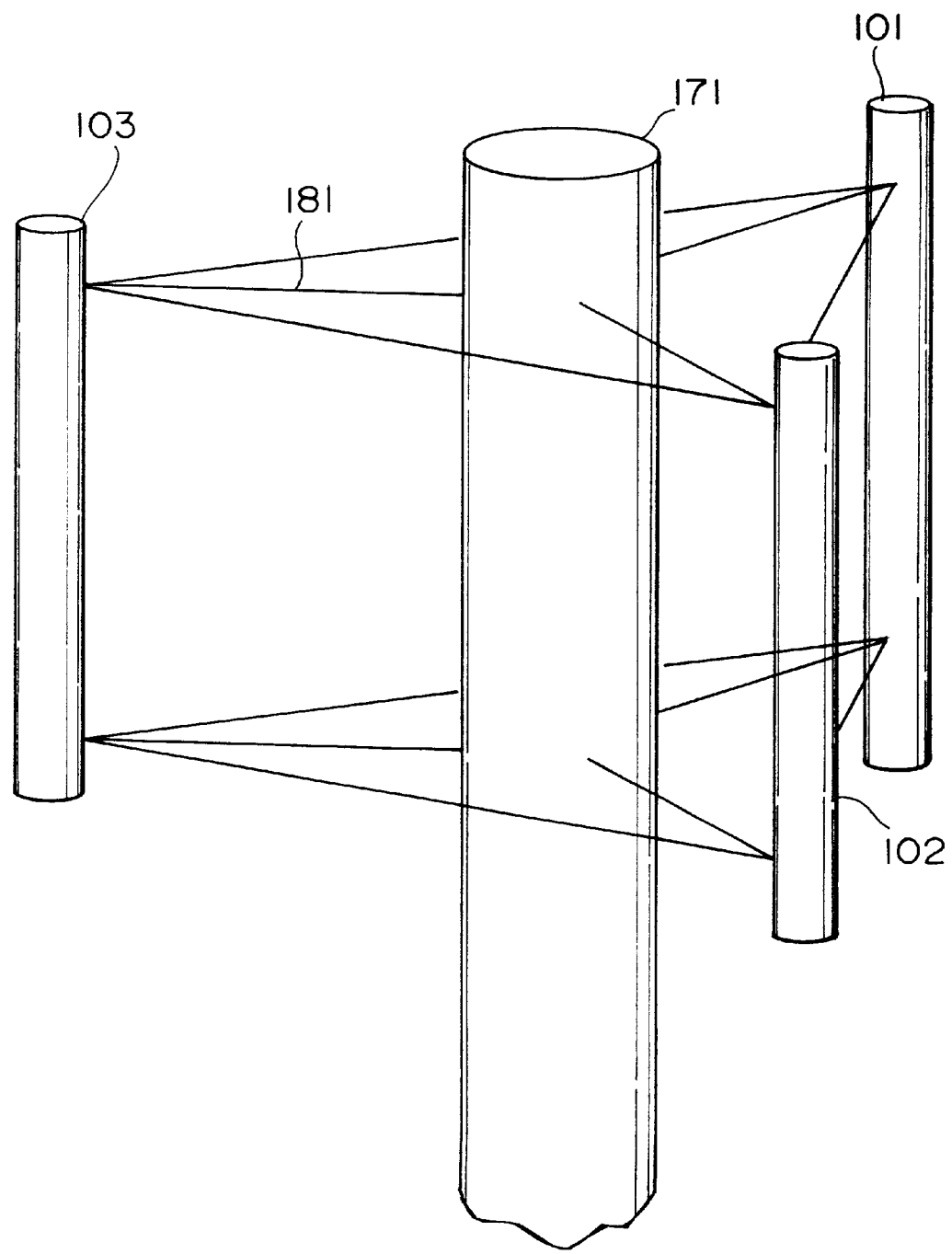
FIG. 5 is a perspective view showing a construction manner of the conventional technology that antennas are fixed to a steel pipe pole.
Figure 6:
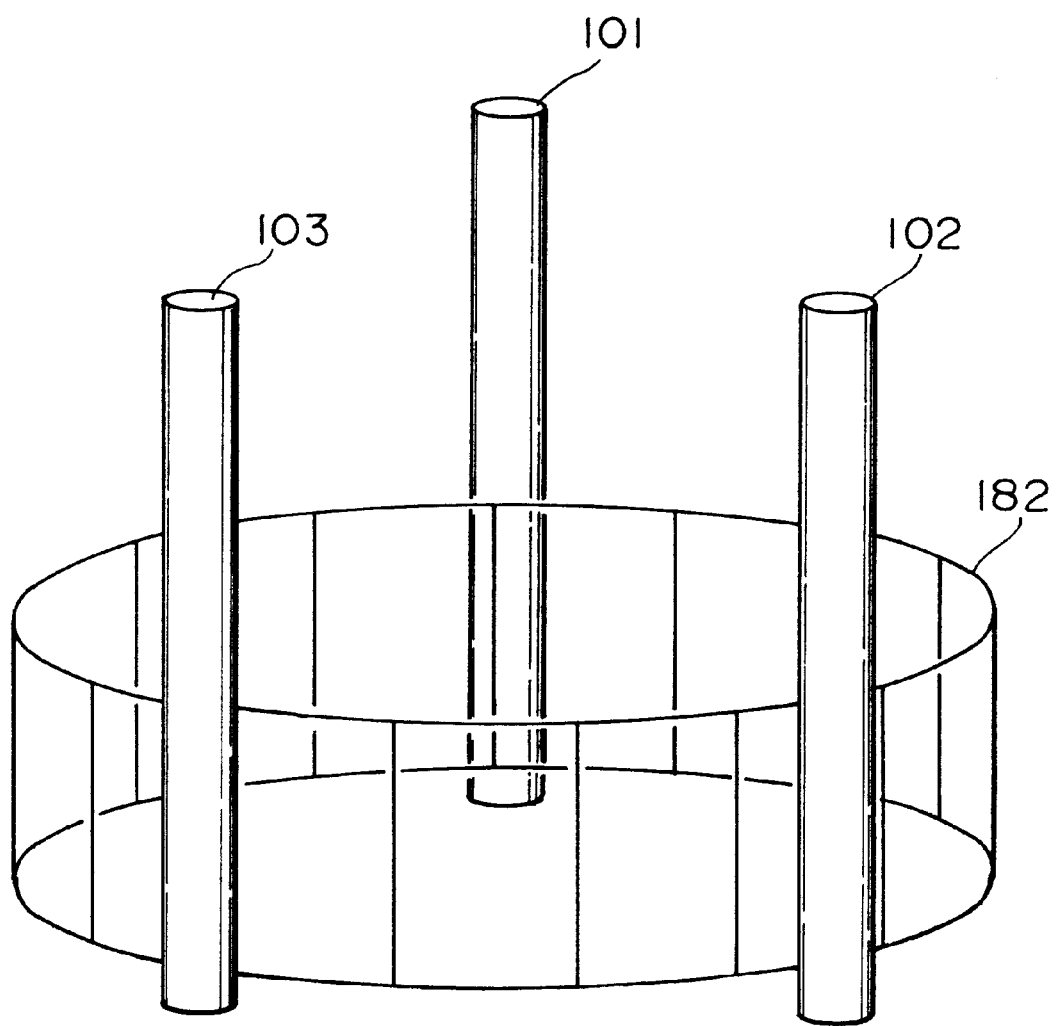
FIG. 6 is a perspective view showing a construction manner of the conventional technology that antennas are fixed to a steel tower.

Referring to FIG. 1 and FIG. 2, a concrete example of the diversity reception system of this invention will be described in detail.

FIG. 1 shows a manner of fixing of a tower overhead receiving power amplifier and antennas which are provided to cope with three sectors, wherein there are provided three single-directivity transmitting-receiving antennas 1, 2 and 3 as well as a non-directivity receiving antenna 4. Each of the single-directivity transmitting-receiving antennas 1 to 3 has a length of two meters and a gain of 15 dBd, while the non-directivity receiving antenna 4 has a length of two meters and a gain of 12 dBd. By fixing the non-directivity receiving antenna 4 just above the single-directivity transmitting-receiving antennas 1 to 3, it is possible to set a center interval of the antennas at two meters. In the case where radio waves actually used belong to a frequency band of 1,500 MHz, ten wavelengths correspond to two meters. In that case, there is no correlation between the antennas. FIG. 2 shows a manner of connections among the single-directivity transmitting-receiving antennas 1 to 3 and the non-directivity receiving antenna 4 as well as transceivers 11 to 13. Each of the transceivers 11 to 13 is configured by a duplexer, a TPA (i.e., transmitting power amplifier), a RPA (i.e., receiving power amplifier), a transmitter and a diversity receiver. A distributor 6 is provided to distribute receiving power of the non-directivity receiving antenna 4 and is constructed by two stages of two-stage distributors, for example. Herein, a single stage of the two-stage distributor has attenuation of 3 dB, so the distributor 6 as a whole has attenuation of 6 dB. As described before, a gain difference of 3 dB is provided between the single-directivity transmitting-receiving antennas 1 to 3 and the non-directivity receiving antenna 4. In order to reduce an amount of loss to zero dB with respect to a range from the antenna and duplexer (31 to 33), a tower overhead receiving power amplifier 44 should compensate a total amount of loss, corresponding to 9 dB, which occurs while the receiving input reaches the diversity receiver. As compared with a gain of the RPA (41 to 43), a gain of the tower overhead receiving power amplifier 44 is made larger by the above amount of gain. The RPAs 41 to 43 respectively connected to the single-directivity transmitting-receiving antennas 1 to 3 are provided prior to the diversity receivers 54 to 56 respectively. On the other hand, the tower overhead receiving power amplifier 44 is fixed just below the non-directivity receiving antenna 4 in order to depress amplification of noise that occurs across feeders 91 to 94.

Lastly, effects of the invention can be summarized as follows:

Because the single-directivity transmitting-receiving antennas, non-directivity receiving antenna and tower overhead receiving power amplifier can be fixed substantially along a vertical line, it is possible to cancel the beams for fixing the antennas to the steel pipe pole as well as the ring for fixing the antennas to the steel tower. Thus, it is possible to reduce weight of the upper portion of the steel pipe pole or steel tower. In addition, it is possible to reduce movement of the center of gravity. Thus, it is possible to provide an economical way for construction of the steel pipe pole or steel tower, while it is possible to reduce construction work for the foundation of the steel pipe pole or steel tower. Because the space that surrounds the steel pipe pole or steel tower and that is occupied by the antennas can be reduced so that the antennas do not stand out, it is possible to expect improvement of the beauty surrounding the facility. As compared with the conventional technology in which each of the transceivers requires two RPAs, the present invention requires only one RPA with respect to each of the transceivers as well as another receiving power amplifier provided in proximity to the non-directivity receiving antenna. Further, the conventional technology requires multiple distributors, a number of which corresponds to a number of antennas. In contrast, the present invention requires only one distributor. Thus, it is possible to reduce parts of the diversity reception system as a whole, so it is possible to downsize (or narrow) the diversity reception system.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. diversity reception system used for a mobile radio communication system of a sector type, comprising:

a plurality of single-directivity transmitting-receiving antennas, which are respectively connected to a plurality of diversity receivers corresponding to sectors;

a distributor for distributing receiving power to the plurality of diversity receivers; and a non-directivity receiving antenna, which is commonly connected to the plurality of diversity receivers via the distributor.

2. The diversity reception system of claim 1, further comprising:

a plurality of first receiving power amplifiers, each of which is connected to a different one of said single-directivity transmitting-receiving antennas corresponding to sectors; and a second receiving power amplifier, which is connected to said non-directivity receiving antenna.

3. The diversity reception system of claim 2, wherein all of the plurality of single-directivity transmitting-receiving antennas, the non-directivity receiving antenna and the second receiving power amplifier are arranged substantially along a vertical line and are fixed to a support pole.

4. A diversity reception system used for a mobile radio communication system of a sector type, comprising:

a plurality of single-directivity transmitting-receiving antennas, which are fixed to a peripheral surface of a support pole and are arranged in directions corresponding to sectors respectively;

a non-directivity receiving antenna, which is fixed to a head portion of the support pole and is arranged above the plurality of single-directivity transmitting-receiving antennas by a prescribed interval of distance;

a plurality of transceivers, which are connected to the plurality of single-directivity transmitting-receiving antennas respectively;

a receiving power amplifier for amplifying receiving power input to the non-directivity receiving antenna, wherein the receiving power amplifier is fixed to the support pole and is located just below the antennas; and a distributor for distributing an output of the receiving power amplifier to the plurality of transceivers,
      wherein diversity reception is performed using any one of the plurality of single-directivity transmitting-receiving antennas and the non-directivity receiving antenna.

5. A diversity reception system as defined in claim 4 wherein each of the plurality of transceivers is configured by a duplexer, a transmitting power amplifier, a receiving power amplifier, a transmitter and a diversity receiver.

6. A diversity reception system as defined in claim 4 wherein the prescribed interval of distance corresponds to at least nine wavelengths of radio waves.

7. A diversity reception system as defined in claim 4 wherein the receiving power amplifier has a gain that compensates gain attenuation of the distributor and gain difference between the single-directivity transmitting-receiving antenna and the non-directivity receiving antenna.

* * * * *